May 7, 1929.  C. PFANSTIEHL  1,712,165
MULTIPLE CONDENSER
Filed July 20, 1925
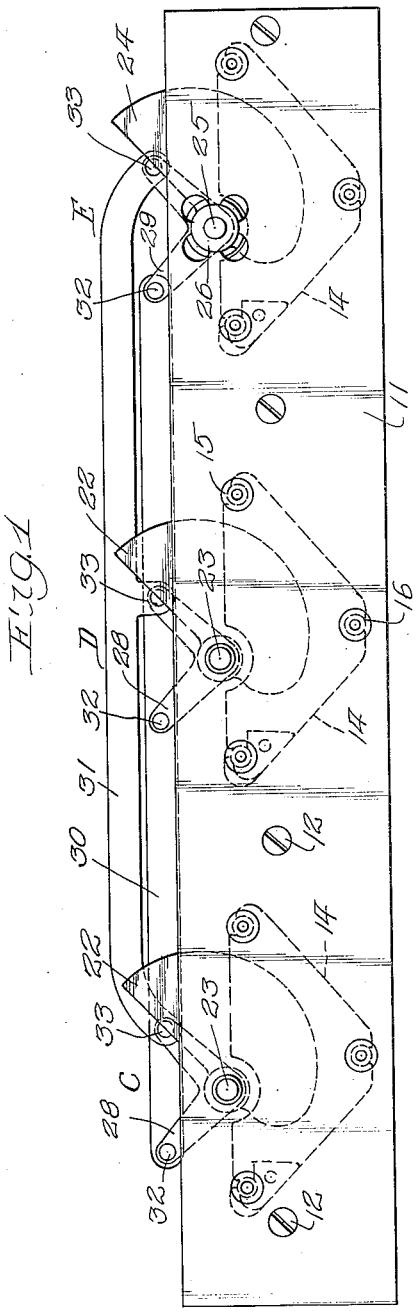
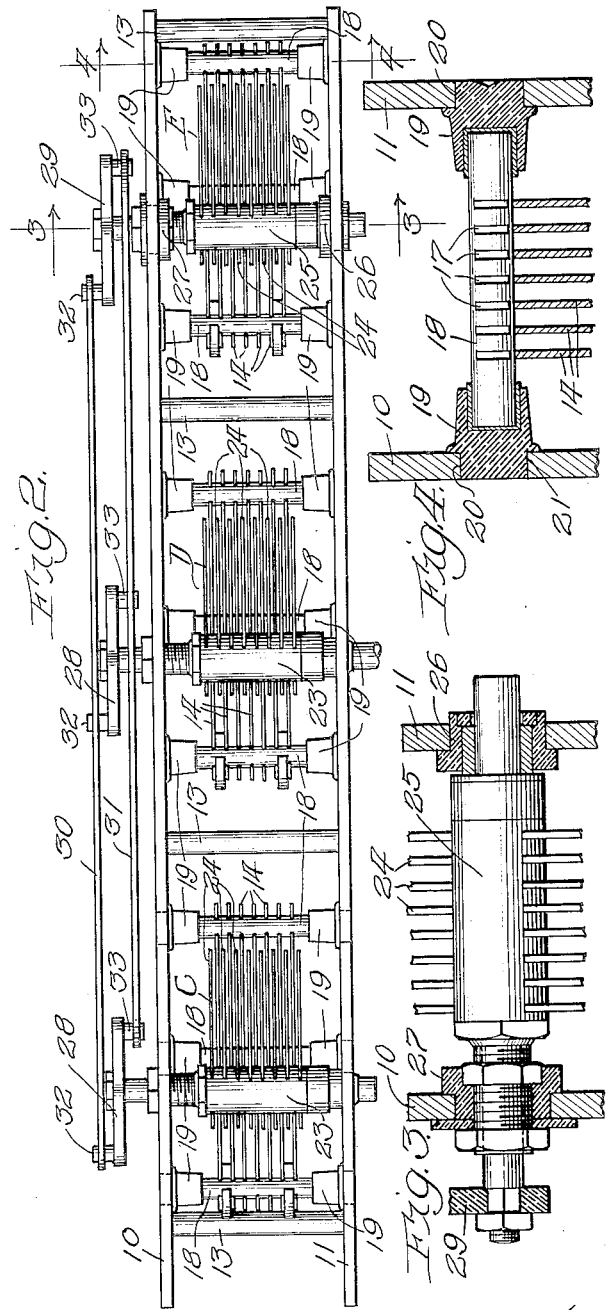
Inventor
Carl Pfanstiehl,
By Dyrenforth, Lee, Chritton & Wiles
Attys.

Patented May 7, 1929.

1,712,165

UNITED STATES PATENT OFFICE.

CARL PFANSTIEHL, OF HIGHLAND PARK, ILLINOIS, ASSIGNOR, BY MESNE ASSIGNMENTS, TO NATIONAL ELECTRICAL PRODUCTS COMPANY, OF WAUKEGAN, ILLINOIS, A CORPORATION OF ILLINOIS.

MULTIPLE CONDENSER.

Application filed July 20, 1925. Serial No. 44,804.

This invention relates to multiple condensers and the like and is particularly adapted to be used in radio receiving sets having one or more stages of radio frequency amplification. The invention is fully described in the following specification and shown in the accompanying drawings, in which Figure 1 is a front elevation of a condenser embodying the invention;

Fig. 2 is a top plan view of the same; and

Figs. 3 and 4 are partially enlarged transverse sections on the lines 3—3 and 4—4 of Fig. 2.

The embodiment illustrated comprises a multiple condenser having a frame composed of metal sides 10 and 11 spaced apart by means of screws 12 threaded into spacer posts 13.

Between the sides 10 and 11 are mounted three variable condensers, C, D, and E. Each condenser has a series of parallel spaced metal stator plates 14 which are notched at 15 and 16 to fit into notches 17 on metal pins 18, the latter being retained by porcelain caps 19 which are shouldered at 20 to pass into holes 21 in the side plates 10 and 11. Thus the stator plates are all insulated from the metal side plates by means of porcelain caps 19.

The rotor plates 22 of condensers C, and D are mounted upon shafts 23 which are journaled in the metal side plates 10 and 11 so that they are always in electrical contact therewith. The rotor plates 22 have the same spacing as the stator plates 14, one of the rotor plates passing between each of the adjacent pair of stator plates as shown in Fig. 2.

The rotor plates 24 of condenser E are carried by a shaft 25 which, as shown in Fig. 3, is journaled in an insulating block 26 which insulates it from the side plate 11 and in an insulating block 27 which insulates it from the side plate 10.

Thus the condensers C and D have their rotor plates electrically connected to the metal side plates 10 and 11 while the rotor plates 24 of the condenser E, as well as the stator plates 24, are electrically insulated from the side plates for a purpose which will hereinafter appear.

In order to simultaneously tune the three circuits of radio frequency amplification to the same wave length, it is necessary that the capacities of the three condensers C, D and E shall be substantially equal to each other at any given setting. To accomplish this the shafts 23 are provided with bell cranks 28 which may be of metal while the shaft 25 is provided with a bell crank 29 of the same shape and dimensions but of insulating material. These bell cranks are also set at the same angle and are pivotally connected by means of side rods 30 and 31 which operate on suitable pins 32 and 33.

From the foregoing it will be understood that by making the rotor plates 22 and 24 identical in size and shape and setting them at the same angle with respect to the bell cranks the capacities of all three condensers will be substantially the same for any given position of the movable plates.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In a multiple condenser, spaced side plates, a plurality of sets of spaced parallel stator plates carried between said side plates and insulated therefrom, a set of rotor plates carried by said side plates in capacitative relation to each set of stator plates, one of said sets of rotor plates being insulated from the side plates and the remaining rotor plates being in electrical contact with said side plates, and means for simultaneously and substantially equally varying the capacities of said condensers.

2. In a multiple condenser, spaced side plates, a plurality of sets of spaced parallel stator plates carried between said side plates and insulated therefrom, a set of rotor plates carried by said side plates in capacitative relation to each set of stator plates, one of said sets of rotor plates being insulated from the side plates and the remaining rotor plates being in electrical contact with said side plates, bell cranks on said rotor plates, and side rods connecting said bell cranks for simultaneously and substantially equally varying the capacities of said condensers.

3. In a multiple condenser, spaced side plates, a plurality of sets of spaced parallel stator plates carried between said side plates and insulated therefrom, a set of rotor plates carried by said side plates in capacitative relation to each set of stator plates, one of said sets of rotor plates being insulated from the side plates and the remaining rotor plates being in electrical contact with said side plates, bell cranks on said rotor plates, and side rods connecting said bell cranks for simultaneously and substantially equally varying the capacities of said condensers, one of said bell cranks being made of an insulating material.

In testimony whereof I have hereunto set my hand this 11th day of July, 1925.

CARL PFANSTIEHL.